US009088966B2

(12) United States Patent
Li et al.

(10) Patent No.: US 9,088,966 B2
(45) Date of Patent: Jul. 21, 2015

(54) PROVIDING LIMITED NETWORK ACCESS TO USER DEVICES

(71) Applicant: Verizon Patent and Licensing Inc., Basking Ridge, NJ (US)

(72) Inventors: Mingxing S. Li, San Jose, CA (US); Priscilla Lau, Fremont, CA (US); Xuming Chen, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 139 days.

(21) Appl. No.: 13/804,458

(22) Filed: Mar. 14, 2013

(65) Prior Publication Data
US 2014/0269525 A1 Sep. 18, 2014

(51) Int. Cl.
*H04W 4/00* (2009.01)
*H04W 76/02* (2009.01)

(52) U.S. Cl.
CPC .................................. *H04W 76/02* (2013.01)

(58) Field of Classification Search
None
See application file for complete search history.

(56) References Cited

U.S. PATENT DOCUMENTS

| | | | |
|---|---|---|---|
| 8,837,500 B2 * | 9/2014 | Cai et al. | 370/410 |
| 2003/0126196 A1 * | 7/2003 | Lagimonier et al. | 709/203 |
| 2005/0111635 A1 * | 5/2005 | Caputo et al. | 379/88.22 |
| 2012/0189016 A1 * | 7/2012 | Bakker et al. | 370/401 |
| 2013/0051313 A1 * | 2/2013 | Durand et al. | 370/328 |
| 2013/0157673 A1 * | 6/2013 | Brusilovsky | 455/450 |
| 2014/0089442 A1 * | 3/2014 | Kim et al. | 709/206 |

* cited by examiner

*Primary Examiner* — Kibrom T Hailu

(57) ABSTRACT

A network device is configured to receive, from a user device that is not subscribed to a network associated with the network device, a connection request identifying a particular service, of one or more services, to provide to the user device. The system may further identify a packet data network (PDN) to establish based on the particular service; identify one or more parameters, associated with the PDN and identifying a data flow, associated with the particular service, that can be provided to the user device; and establish the PDN based on the one or more PDN parameters. The PDN may permit only the data flow, associated with the particular service, to be transmitted to the user device. The system may further provide the data flow, associated with the particular service, to the user device via the PDN.

20 Claims, 8 Drawing Sheets

| Service Name 410 | PDN Parameters 420 | Payer 430 | QoS Parameters 440 |
|---|---|---|---|
| Emergency Call | Allow call to phone number 911 | Network provider | QoS Parameters 1 |
| Customer service | Allow call to customer service phone number | Network provider | QoS Parameters 2 |
| Collect Call | Allow call to custom phone number | Call recipient | QoS Parameters 3 |
| Game.com | Allow access to game.com | Game.com host | QoS Parameters 4 |

PROVIDING LIMITED NETWORK ACCESS TO USER DEVICES

BACKGROUND

Users sometimes subscribe to a network service plan to access a network to perform a task using a user device. For example, the user may use the user device to access a web page, place a telephone call, communicate with another user device, or perform some other task (e.g., via the network). Network devices may authorize the user device to access the network based on subscription information associated with the user device. Network devices sometimes block access of user devices that do not have an associated subscription, thereby preventing the user device from accessing any services provided by the network, including a service that allows the user to place a telephone call to subscribe to the network service plan.

BRIEF DESCRIPTION OF THE DRAWINGS

FIG. 4 illustrates an example data structure that may be stored by one or more devices in the environment of FIG. 2;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may allow a user device to receive a limited service, provided by a network, when the user device is not subscribed to the network (e.g., when a user of the user device is not subscribed to a network service plan). For example, the user device may use the network to place an emergency telephone call, place a call to a customer service representative, place a collect call, access a particular application via an application server (e.g., a gaming application, a weather report application, a vehicle traffic report application, or the like), access a web page, etc.

Figure 1:
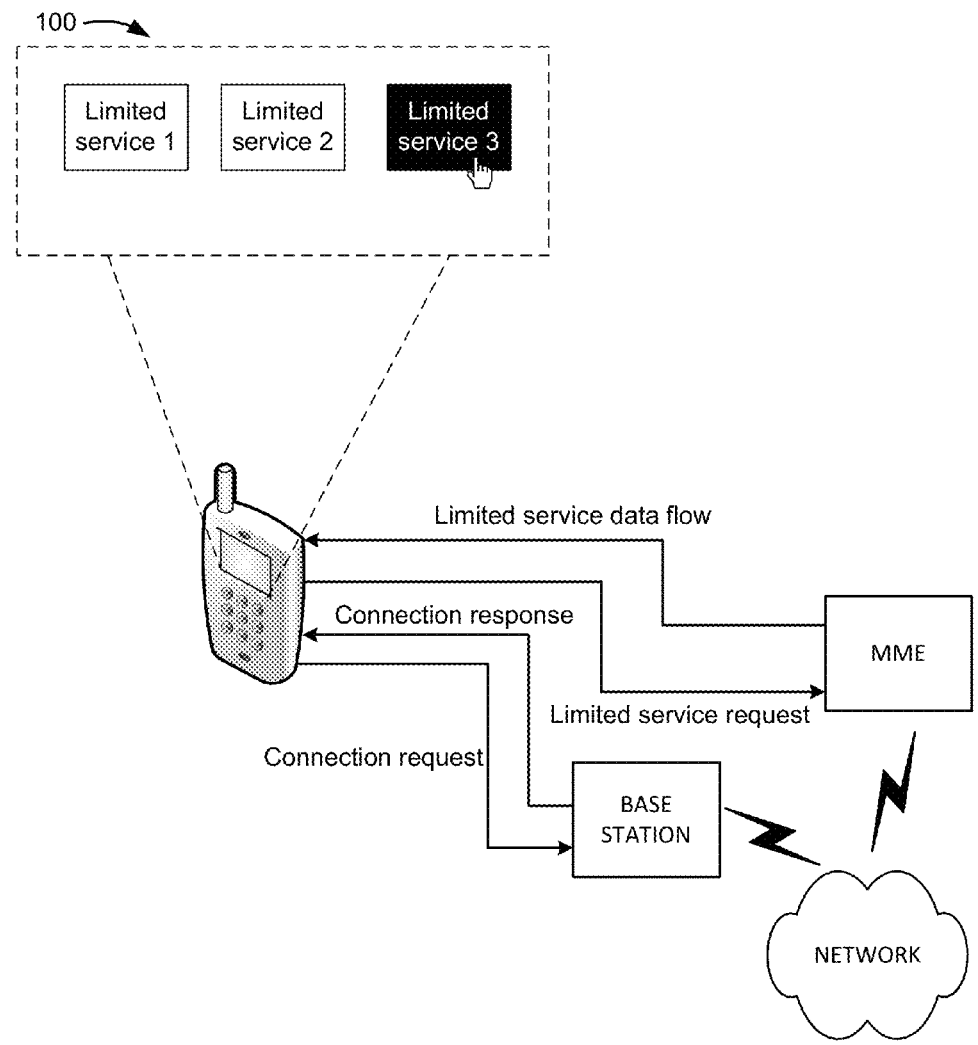
FIG. 1 illustrates an example overview of an implementation described herein.

FIG. 1 illustrates an example overview of an implementation described herein. In FIG. 1, assume that a user device is not subscribed to a network. Given this assumption, and as shown in FIG. 1, the user device may request to connect to a base station associated with the network. In some implementations, the user device may send a connection request (e.g., a radio resource control (RRC) request, an evolved packet system (EPS) attach request, a combined EPS attach request, or the like) in order to request access to the base station and to the network. In some implementations, the connection request may include a request to access a limited service. As shown in FIG. 1, the base station may provide a connection response to the user device to authorize the user device to access the network to receive a limited service. In some implementations, the connection response may include a list of limited services that a user of the user device may select to access (e.g., via a user interface of the user device, such as interface 100).

As further shown in FIG. 1, the user device may receive a selection of a particular limited service and may provide a limited service request (including the selection of the particular limited service) to a mobility management entity device (hereinafter referred to as an "MME"). The MME may identify service parameters, associated with the particular limited service, and may provide a data flow relating to the limited service (e.g., via one or more network devices associated with the network) to the user device in accordance with the service parameters. For example, the service parameters may identify content that the user device may receive (e.g., web content, audio content, video content, etc.) and/or content that the user device is not permitted to receive. Additionally, or alternatively, the service parameters may identify a telephone number to which the to that the user device may place a call. Additionally, or alternatively, the service parameters may identify some other service that the user device may or may not access.

As a result, the user device may access a particular group of limited services without the user device needing a subscription to the network. For example, the user device may access the particular group of services when a subscription may not be practical for a user who may not access the network enough to justify the cost of the subscription. Additionally, or alternatively, the user device may be used to call a customer service representative using the network (e.g., to subscribe/re-subscribe the user device to the network and/or to receive troubleshooting assistance for the user device). Additionally, or alternatively, the user device may be used to place an emergency call, place a collect call, place a toll-free call, visit a particular web page, and/or use a limited amount of network data (e.g., a limited number of voice call minutes and/or a limited amount of data) that the user may pay for on a pay-as-you-go basis.

In some implementations, a party separate from the user of the user device may pay for network usage costs associated with providing the user device with the limited service via the network. For example, a party associated with the customer service representative may pay for the call between the user device and the customer service representative. Similarly, a party associated with a web page may pay for the network usage to provide the web page to the user device. For example, the web page or application may include an advertisement to allow the party to recoup the network usage costs.

Figure 2:
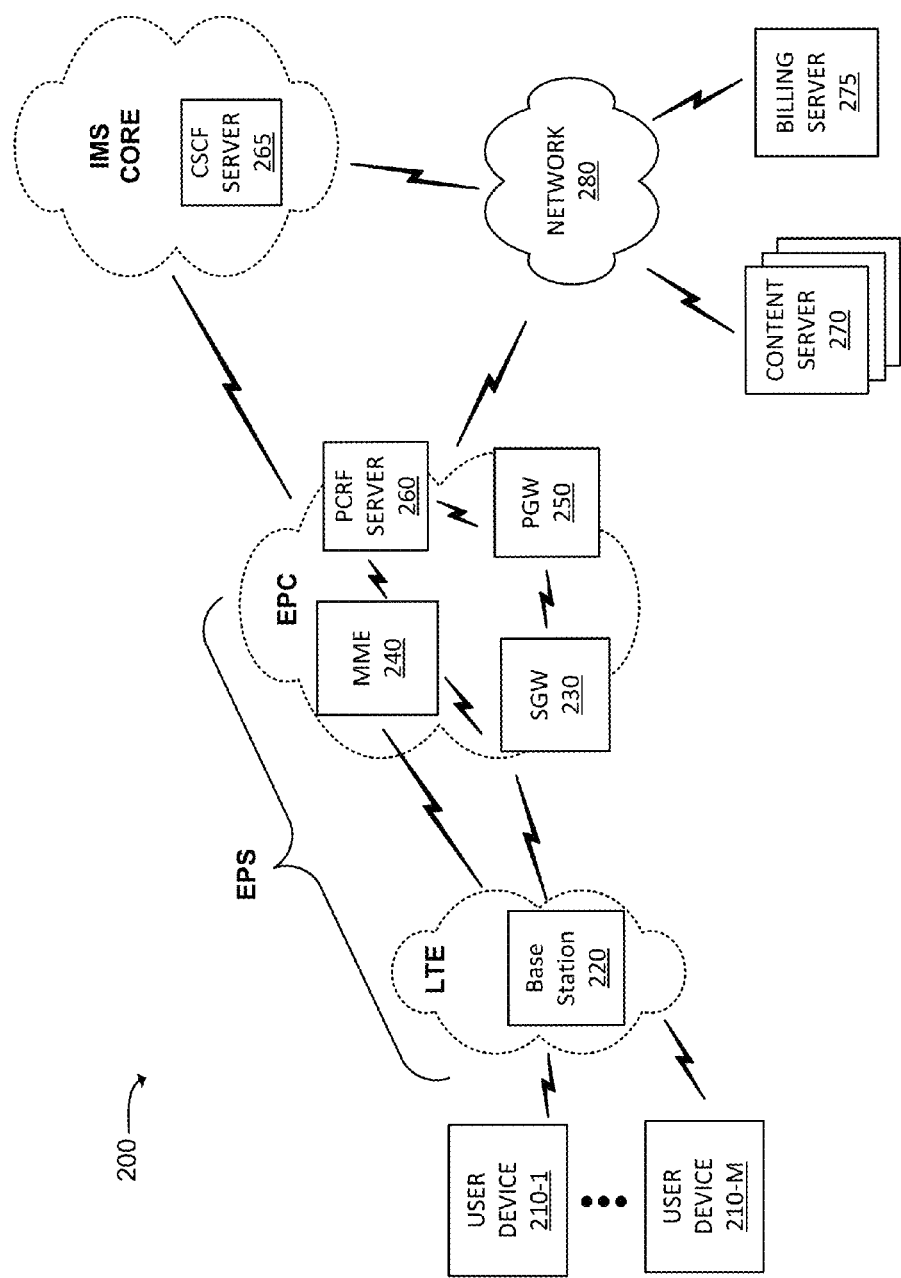
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210, . . . , 210-M (where M≥1), base station 220, serving gateway 230 (referred to as "SGW 230"), MME 240, packet data network (PDN) gateway (PGW) 250, policy charging and rules function PCRF server 260 (referred to as "PCRF server 260"), call service control function server 265 (referred to as "CSCF server 265"), content server 270, billing server 275, and network 280.

Environment 200 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations 220, such as eNodeBs (eNBs), via which user device 210 communicates with the EPC. The EPC may include SGW 230, MME 240, PGW 250, and/or PCRF 260 that enables user device 210 to communicate with network 280 and/or an Internet protocol (IP) multimedia subsystem (IMS) core. The IMS core may include CSCF server 265.

User device 210 may include a computation or communication device, such as a wireless mobile communication device that is capable of communicating with base station 220 and/or a network (e.g., network 280). For example, user device 210 may include a radiotelephone, a personal communications system (PCS) terminal (e.g., that may combine a cellular radiotelephone with data processing and data communications capabilities), a personal digital assistant (PDA), a smart phone, a laptop computer, a tablet computer, a vehicle accident notification device, a vehicle navigation device, a personal gaming system, or another type of computation or communication device. User device 210 may send data to and/or receive data from network 280. In some implementations, user device 210 may send a limited service request to base station 220 and/or MME 240 to access a limited service. For example, user device 210 may include an application that provides the limited service request. In some implementations, user device 210 may receive the application from base station 220, a service provider, a website, and/or from some other source.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to network 280 via SGW 230 and PGW 250. Base station 220 may send traffic to and/or receive traffic from user device 210 via an air interface. One or more of base stations 220 may be associated with a RAN, such as the LTE network.

SGW 230 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 280 via PGW 250. In one example implementation, SGW 230 may route and forward user data packets, may act as a mobility anchor for a user plane during inter-eNB handovers, and may act as an anchor for mobility between LTE and other 3GPP technologies.

MME 240 may include one or more network devices that perform operations associated with a handoff to and/or from the EPS. MME 240 may perform operations to register user device 210 with the EPS, to handoff user device 210 from the EPS to another network, to handoff a user device 210 from the other network to the EPS, and/or to perform other operations. MME 240 may perform policing operations for traffic destined for and/or received from user device 210. In some implementations, MME 240 may authenticate user device 210 to use the EPS. In some implementations, MME 240 may skip authentication of user device 210 and may allow user device 210 to use the EPS when receiving a limited service type attach request. In some implementations, MME 240 may establish a PDN (e.g., a tunnel) to allow user device 210 to receive a data flow associated with a limited service and to prevent user device 210 from receiving a data flow not associated with the limited service.

PGW 250 may include one or more network devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and/or packet screening. PGW 250 may also act as an anchor for mobility between 3GPP and non-3GPP technologies.

PCRF 260 may include one or more network devices, that may store subscriber information, such as voice call and data rate plans or quotas for subscribers. PCRF 260 may provide network control regarding service data flow detection, gating, Quality of Service (QoS), and/or flow based charging. Policies and rules regarding QoS may include policies and rules instructing user device 210 and/or network devices (e.g., base station 220, SGW 230, MME 240, PGW 250, etc.) to minimize packet loss, to implement a packet delay budget, to provide a guaranteed bit rate (GBR), to provide a particular latency, and/or to perform other activities associated with QoS. PCRF 260 may provide policies and rules to other network devices, SGW 230 and/or PGW 250, to implement network control. PCRF 260 may determine how a certain service data flow shall be treated, and may ensure that user plane traffic mapping and QoS is in accordance with a user's profile and/or network policies.

CSCF server 265 may include one or more computing devices, such as a server device or a collection of server devices. CSCF server 265 may process and/or route calls to and from user device 210 via the EPC. For example, CSCF server 265 may process calls, received from network 280, that are destined for user device 210. Additionally, or alternatively, CSCF server 265 may process calls, received from user device 210, that are destined for network 280.

Content server 270 may include one or more computing devices, such as a server device or a collection of server devices. In some implementations, content server 270 may store content destined for user device 210, such as audio content, video content, web page content, weather content, vehicle traffic content, or the like. In some implementations, content server 270 may provide content to user device 210 such that an account of content server 270 is charged for network usage costs associated with providing the content to user device 210 via the EPS. For example, an owner of content server 270 may establish a relationship with a network service provider, associated with the EPS, to provide content (e.g., as part of a limited service) to user device 210 and to absorb network usage costs associated with providing the content to user device 210. In some implementations, content server 270 may provide billing information to billing server 275 to direct billing server 275 to assess a charge to the account of content server 270 based on usage of the EPS to provide content to user device 210 via the EPS.

Billing server 275 may include one or more computing devices, such as a server device or a collection of server devices. In some implementations, billing server 275 may receive billing information from content server 270 and/or from some other device in environment 200. In some implementations, billing server 275 may receive usage information that identifies network usage of the EPS by user device 210 and/or content server 270. In some implementations, the usage information may be expressed in terms of data units (e.g., bytes, kilobytes, megabytes, etc.) and/or in terms of time (e.g., calling minutes, network usage minutes, etc.). In some implementations, charges may be assessed to an account associated with user device 210 and/or content server 270 based on the billing information and the usage information.

Network 280 may include one or more wired and/or wireless networks. For example, network 280 may include a cellular network, a public land mobile network (PLMN), a second generation (2G) network, a third generation (3G) network, a fourth generation (4G) network, a fifth generation (5G) network, and/or another network. Additionally, or alternatively, network 280 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
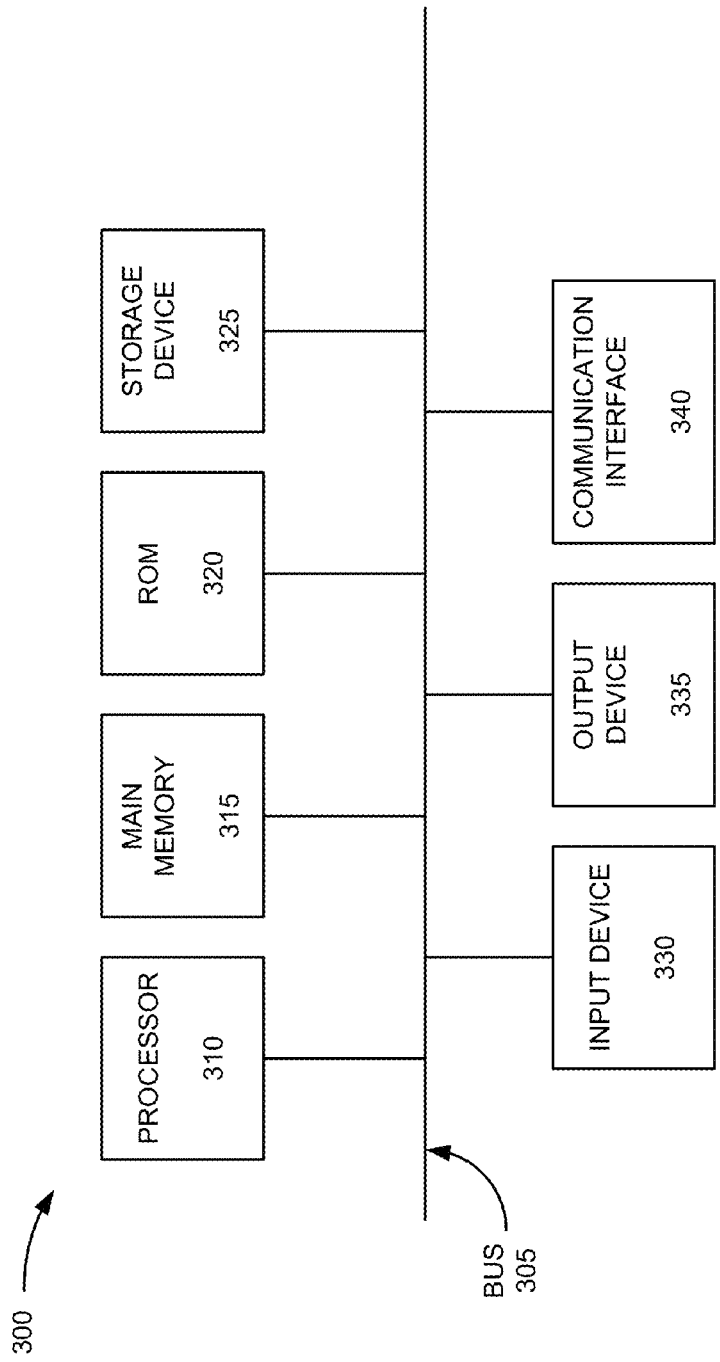
FIG. 3 illustrates example components of a device that may be used within the environment of FIG. 2.

FIG. 3 illustrates example components of a device 300 that may be used within environment 200 of FIG. 2. Device 300 may correspond to user device 210, base station 220, SGW 230, MME 240, PGW 250, PCRF 260, CSCF server 265, content server 270, and/or billing server 275. Each of user device 210, base station 220, SGW 230, MME 240, PGW 250, PCRF 260, CSCF server 265, content server 270, and/or billing server 275 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

FIG. 4 illustrates an example data structure 400 that may be stored by one or more devices in environment 200. In some implementations, data structure 400 may be stored in a memory of MME 240. In some implementations, data structure 400 may be stored in a memory separate from, but accessible by, MME 240. In some implementations, data structure 400 may be stored by some other device in environment 200, such as base station 220, SGW 230, PGW 250, PCRF 260, CSCF server 265, content server 270, and/or billing server 275.

A particular instance of data structure 400 may contain different information and/or fields than another instance of data structure 400. In some implementations, information stored by data structure 400 may identify limited services that user device 210 may access when user device 210 provides a limited service connection request to base station 220 and/or MME 240. For example, information stored by data structure 400 may identify a limited service that a content provider (e.g., an owner of content server 270) may provide to user device 210 (e.g., based on an agreement between the content provider and a network service provider associated with MME 240).

As shown in FIG. 4, data structure 400 may include service name field 410, PDN parameters field 420, payer field 430, and QoS parameters field 440.

Service name field 410 may include a description of a limited service that user device 210 may access. For example, as shown in FIG. 4, service name field 410 may store a description such as "emergency call" to identify that user device 210 may place an emergency call. Additionally, or alternatively, service name field 410 may store a description such as "customer service" to identify that user device 210 may place a call to a customer service telephone number associated with a network service provider (e.g., to allow a user of user device 210 to subscribe to a network service plan). Additionally, or alternatively, service name field 410 may store some other description to identify some other limited service that user device 210 may access. In some implementations, service name field 410 may include some other information not shown in FIG. 4. For example, service name field 410 may include an identifier (ID) of a PDN corresponding to the service name. In some implementations, MME 240 may receive the service name and/or an ID of the PDN from user device 210 as part of a limited service request (e.g., when user device 210 requests to access a particular limited service).

PDN parameters field 420 may include information that MME 240 may use to establish a PDN to allow user device 210 to receive a data flow associated with a particular limited service. For example, for a limited service allowing emergency calls, PDN parameters field 420 may include information that allows a data flow to permit user device 210 to place a telephone call to an emergency telephone number (a data flow between user device 210, device in the EPC, and CSCF server 265). In some implementations, PGW 250 may filter traffic to and/or from user device 210 using the established PDN and based on information stored by PDN parameters field 420 (e.g., to allow user device 210 to receive a data flow associated with the particular limited service while preventing user device 210 from receiving a data flow not associated with the particular limited service).

Payer field 430 may store information to identify a party responsible for network usage costs associated with providing user device 210 with a data flow relating to a limited service. For example, in the case where the limited service allows user device 210 to access a particular web page (e.g., game.com), payer field 430 may store information to identify that an owner of the particular web page is responsible for the network usage costs to deliver content relating to the particular web page. In some implementations, payer field 430 may store information to identify a particular content server 270, such as an IP address of content server 270, an account number of content server 270, or the like (e.g., when the limited service allows user device 210 to receive content provided by the particular content server 270). In some implementations, payer field 430 may identify a sponsor of a third party application executing on the user device (e.g., a gaming application, a traffic reporting application, etc.).

In some implementations, payer field 430 may store network usage costs in terms of a rate (e.g., a price per kilobyte of content delivered to and/or from user device 210, a price per minute of a telephone call placed by user device 210, etc.). In some implementations, payer field 430 may include some other information to identify a payer responsible for network usage costs (e.g., an IP address associated with the payer, an ID of the payer, etc.). In some implementations, information stored by payer field 430 may correspond to an agreement between the payer and a network service provider associated with base station 220 and/or MME 240. In some implementations (e.g., for a collect call service), a payer may correspond to the recipient of the collect call that may receive charging information prior to accepting the collect call. In some implementations (e.g., for a pay-as-you-go service), the payer may correspond to the user of user device 210 who may pay for a limited number of calling minutes or a limited amount of data usage.

QoS parameters field 440 may store information to identify a QoS treatment that PCRF 260 may apply to a particular data flow associated with a particular limited service. For example, QoS parameters field 440 may store information identifying a GBR value, a jitter value, a latency value, or some other QoS parameter. In some implementations, information stored by QoS parameters field 440 may be received by an operator of MME 240 and may be based on a demand for network resources associated with the particular limited service. Additionally, or alternatively, information stored by QoS parameters field 440 may be based on network usage costs that a payer is willing to absorb (e.g., different QoS parameters may yield different network usage costs).

While particular fields are shown in a particular format in data structure 400, in practice, data structure 400 may include additional fields, fewer fields, different fields, or differently arranged fields than are shown in FIG. 4.

Figure 5:
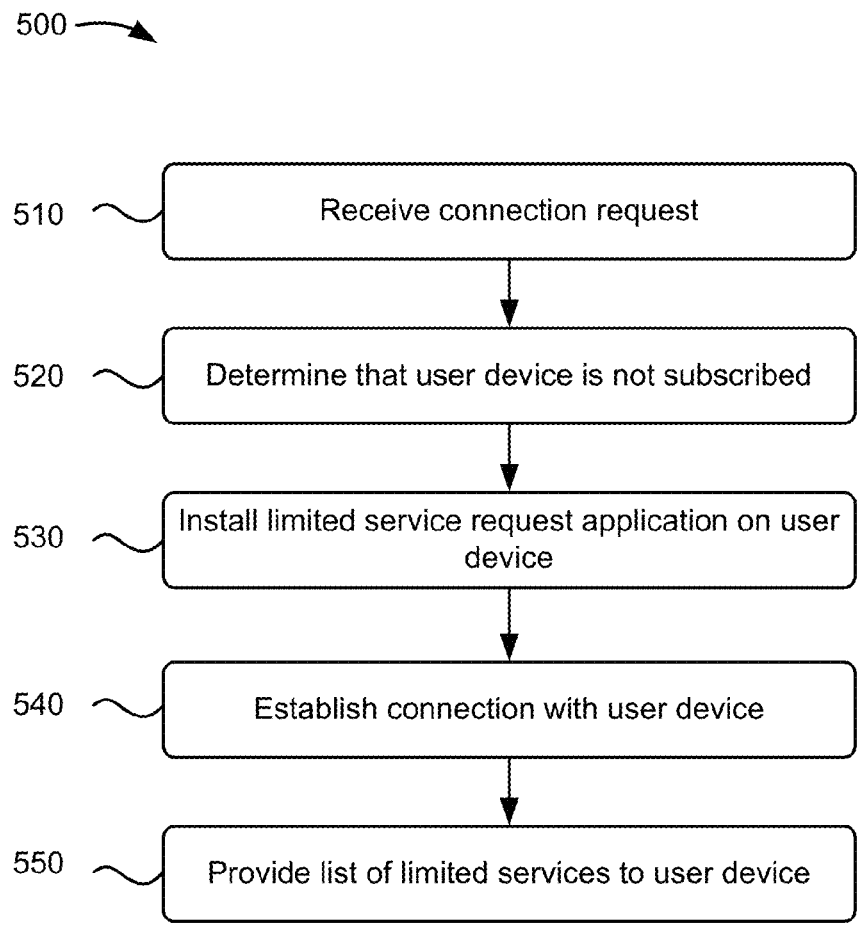
FIG. 5 illustrates a flowchart of an example process for providing a list of limited services to a user device.

FIG. 5 illustrates a flowchart of an example process 500 for providing a list of limited services to user device 210. In one implementation, process 500 may be performed by one or more components of base station 220. In another implementation, some or all of blocks of process 500 may be performed by one or more components of another device in environment 200 (e.g., SGW 230, MME 240, PGW 250, PCRF 260, or CSCF server 265), or a group of devices including or excluding base station 220.

As shown in FIG. 5, process 500 may include receiving a connection request (block 510). For example, base station 220 may receive a connection request from user device 210 when a user of user device 210 powers on user device 210 to perform a task and/or when a user of user device 210 selects to connect to base station 220 to access network 280 via the EPS. In some implementations, the connection request may be an RRC connection request, an EPS attach request, an EPS combined attach request, and/or some other type of connection request. In some implementations, the attach request may include a connection establishment clause value, such as "limitedService" and/or some other clause value.

Process 500 may also include determining that the user device is not subscribed (block 520). For example, base station 220 may determine that user device 210 is not subscribed to base station 220 (e.g., when user device 210 is not part of a network service plan to access base station 220) based on receiving the connection request. In some implementations, base station 220 may determine that user device 210 is not subscribed when an identifier of user device 210 (e.g., a device ID, a subscriber identity module (SIM) card number, an international mobile equipment identifier (IMEI), or the like) does not match an identifier in a list of identifiers (stored by base station 220 and/or another device in environment 200) associated with subscribed user devices 210.

Process 500 may further include installing a limited service request application on the user device (block 530). For example, base station 220 may provide the limited service request application to user device 210. In some implementations, the limited service request application may direct user device 210 to provide a limited service request for subsequent connection requests provided to base station 220.

Process 500 may also include establishing a connection with the user device (block 540). For example, base station 220 may establish the connection (e.g., an RRC connection, or some other type of connection) with user device 210 based on receiving a connection request that includes a limited service request. For example, base station 220 may establish the connection with user device 210 using an RRC protocol that identifies connection establishment functions, bearer establishment functions, etc.

Process 500 may further include providing a list of limited services to the user device (block 550). For example, base station 220 may provide a list of limited services based on establishing the connection with user device 210 and based on receiving the limited service request as part of the connection request. In some implementations, base station 220 may direct user device 210 to access a portal (e.g., a web page) having the list of limited services. In some implementations, the list of limited services may be based on information stored by data structure 400 and may be displayed by user device 210 (e.g., as described above with respect to interface 100). In some implementations, a user of user device 210 may select a limited service (e.g., via a user interface of user device 210) in order to request access to the limited service.

While a particular series of blocks has been described above with regard to FIG. 5, the operations, data flows, and/or the order of the blocks may be modified in other implementations. Further, non-dependent operations and/or data flows may be performed in parallel. In some implementations, some blocks of process 500 may be omitted. For example, blocks 520-530 may be omitted when base station 220 receives a limited service request as part of the connection request in block 510 (e.g., when user device 210 includes the limited service request application previously received from base station 220 and/or previously received from some other source).

Figure 6:
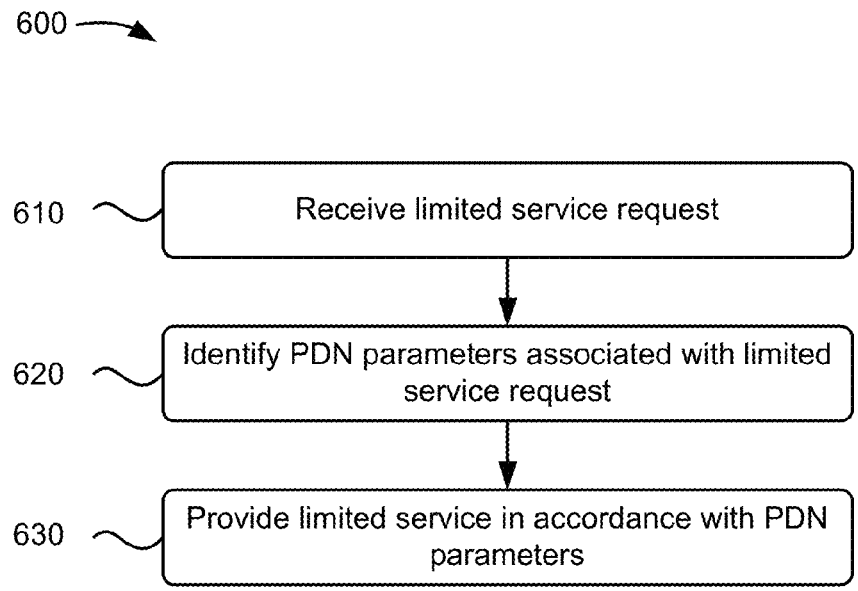
FIG. 6 illustrates a flowchart of an example process for providing a limited service to a user device.

FIG. 6 illustrates a flowchart of an example process 600 for providing a limited service to a user device. In one implementation, process 500 may be performed by one or more components of MME 240. In another implementation, some or all of blocks of process 500 may be performed by one or more components of another device in environment 200 (e.g., base station 220, SGW 230, PGW 250, PCRF 260, or CSCF server 265), or a group of devices including or excluding MME 240. In FIG. 6, assume that user device 210 has established a limited service connection with base station 220 (e.g., in accordance with process 500, as described above) and that user device 210 receives information identifying available limited services for display on a user interface of user device 210.

As shown in FIG. 6, process 600 may include receiving a limited service request (block 610). For example, MME 240 may receive a limited request from user device 210 when a user of user device 210 selects a limited service (e.g., via a user interface of user device 210, as described above). In some implementations, the limited service request may include information identifying the limited service, such as a service name, a service identifier, a PDN identifier, and/or some other information to identify the limited service requested by user device 210. In some implementations, the connection request may include a request value, such as "limitedService" or some other value to indicate that the connection request is for a limited service.

Process 600 may also include identifying PDN parameters associated with the limited service request (block 620). For example, MME 240 may identify the PDN parameters based on the information identifying the limited service and information stored by data structure 400 that maps the PDN parameters to the information identifying the service. In some implementations, MME 240 may establish a PDN based on the PDN parameters. For example, MME 240 may use a control plane function to create the PDN in the form of a communications tunnel between user device 210 and PGW 250. Additionally, or alternatively, MME 240 may direct PGW 250 to establish the communications tunnel between user device 210 and PGW 250. In some implementations, the communications tunnel may be used to permit PGW 250 to provide data flows, permitted by the limited service as identified in the PDN parameters, to user device 210 while preventing data flows, not permitted by the limited service, from being provided to user device 210.

Process 600 may further include providing the limited service in accordance with the PDN parameters (block 630). For example, MME 240 may provide a data flow, associated with the limited service selected by a user of user device 210, to user device 210 in accordance with the PDN parameters. In some implementations, MME 240 may cause devices in environment 200 to provide the data flow, associated with the limited service, to user device 210 in accordance with the PDN parameters. For example, the PDN may cause PGW 250 to filter packets in accordance with the PDN parameters such that user device 210 can receive a data flow, associated with the selected limited services, without receiving data flows associated with other services. Additionally, or alternatively, the PDN may cause PCRF 260 to provide a particular QoS to the data flow received by user device 210. Additionally, or alternatively, the PDN may cause CSCF server 265 to process a call instruction in accordance with the PDN parameters (e.g., allow user device 210 to place a telephone call to a particular telephone number associated with the selected limited service).

While a particular series of blocks has been described above with regard to FIG. 6, the operations, data flows, and/or the order of the blocks may be modified in other implementations. Further, non-dependent operations and/or data flows may be performed in parallel.

Figure 7:
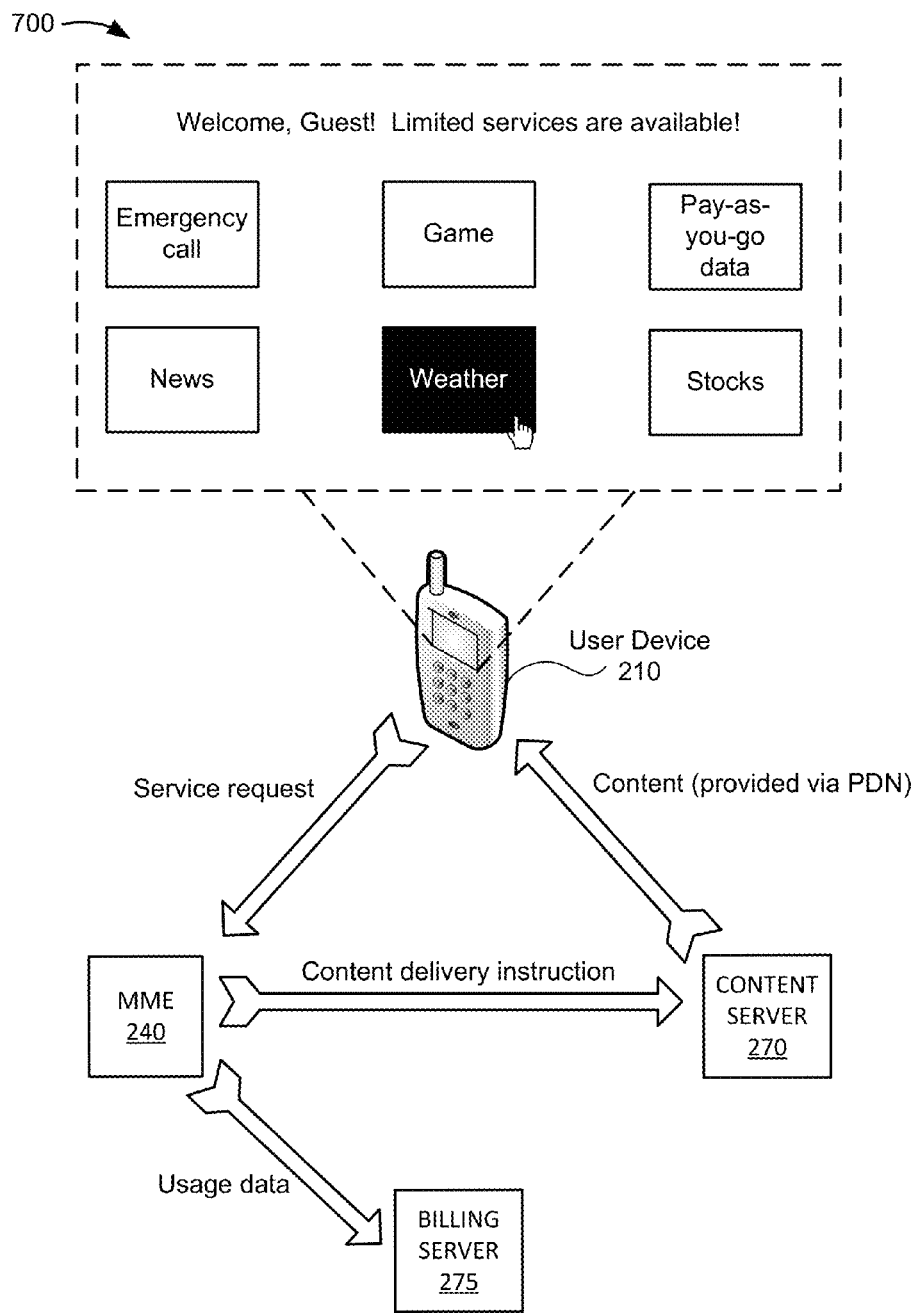
FIGS. 7-8 illustrate example implementations as described herein.

FIG. 7 illustrates an example implementation as described herein. In FIG. 7, assume that user device 210 is not subscribed to a network. Further, assume that user device 210 connects to base station 220 and that base station 220 directs user device 210 to connect to a portal (e.g., a web page) having information identifying limited services that user device 210 may access (e.g., in accordance with process 500). Given these assumptions, user device 210 may display the information identifying the limited services in a user interface of user device 210 (e.g., as shown in interface 700). For example, the information identifying the limited services may be presented as an arrangement of icons in interface 700. Additionally, or alternatively, the information identifying the limited services may be presented in a list format and/or in some other format.

In FIG. 7, assume that a user of user device 210 selects a particular limited service, such as a service that provides weather information to user device 210. For example, the user may interact with interface 700 to select the particular limited service. In some implementations, user device 210 may provide a limited service request to MME 240 based on receiving a selection of the particular limited service. As described above, the limited service request may include a description of the particular limited service, an identifier of the particular limited service, and/or some other information regarding the particular limited service. In some implementations, MME 240 may determine PDN parameters, associated with the limited service request and may establish a PDN based on the PDN parameters.

In FIG. 7, assume that the PDN parameters allow MME 240 to access a particular web page having content stored by content server 270 (e.g., weather related content). Given this assumption, MME 240 may provide a content delivery instruction to content server 270 to direct content server 270 to provide the content to user device 210 (e.g., via the established PDN) such that user device 210 receives content relating to the limited service and does not receive content that is not related to the limited service. In some implementations, MME 240 may receive usage information that identifies data transferred to and/or from user device 210 via the PDN. As described above, the PDN may be associated with a payer (e.g. an owner of content server 270) that may incur network usage costs associated with providing the content to user device 210. In some implementations, MME 240 may provide the usage data to billing server 275 such that billing server 275 may perform a billing settlement function to assess a charge to an account associated with the payer. As described above, content server 270 may provide an advertisement, to user device 210, to receive revenue associated with providing the advertisement (e.g., to recoup network usage costs when providing content to user device 210 or to realize a profit when the revenue exceeds the network usage costs).

While a particular example is shown in FIG. 7, it will be apparent that the above description is merely an example implementation. For example, in practice, interface 700 may have a different format and may appear differently than what is shown in FIG. 7. Also, the presentation of the information identifying the limited services may be in a different format than what is shown in FIG. 7.

Figure 8:
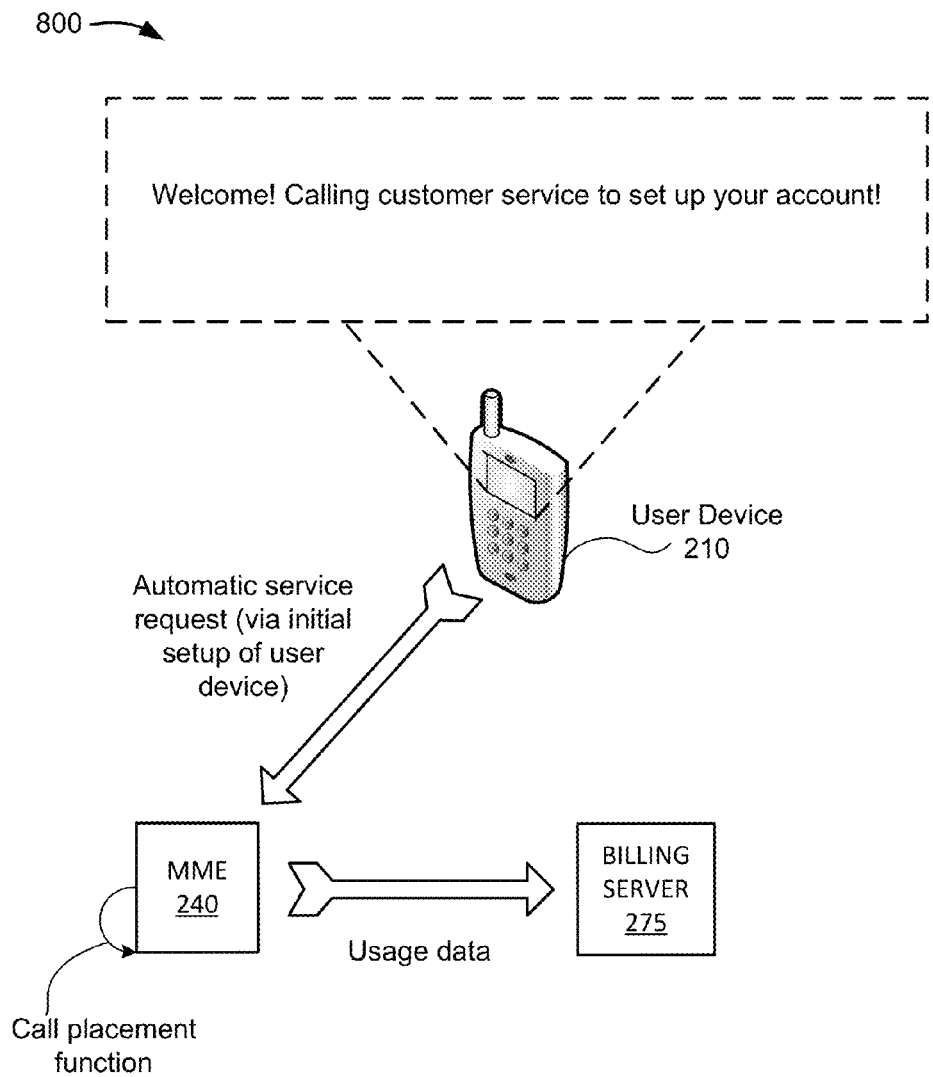

FIG. 8 illustrates an example implementation as described herein. In FIG. 8, assume that user device 210 is not subscribed to a network and that user device 210 connects with base station 220 in accordance with process 500 as described above. Further, assume that user device 210 includes an application that causes user device 210 to automatically provide a limited service request to MME 240 (e.g., provide the limited service request without user interaction). For example, user device 210 may automatically provide the limited service request as part of an initial set up process of user device 210. Further, assume that the limited service request includes a request to place a telephone call to a customer service center. Given these assumptions, MME 240 may perform a call placement function to place the telephone call (e.g., via CSCF server 265) in accordance with the limited service request. In some implementations, the limited service request may allow a user of user device 210 to place a telephone call to a customer service center using user device 210 (e.g., to allow the user to subscribe to a network service plan). In some implementations, user device 210 may display an indication (e.g., in interface 800) that a customer service center is being called. Alternatively, user device 210 may forgo displaying such an indication. As further shown in FIG. 8, MME 240 may provide usage data to billing server 275 to identify network usage associated with the telephone call and such that billing server 275 may assess a charge to an account associated with the customer service center.

In some implementations, the user device 210 in FIG. 8 may correspond to a mobile phone device. Additionally, or alternatively, user device 210 may correspond to a vehicle accident notification device and/or a navigation device that may require a telephone call to the customer service center to allow the user of user device 210 to establish an account and to receive a service using user device 210 (e.g., a vehicle accident notification service, a vehicle navigation service, or the like).

As described above, user device 210 may access a particular group of limited services, provided by a network, without a user of user device 210 needing a subscription to a network service plan. For example, user device 210 may be used to access the particular group of services when a subscription may not be practical for the user who may not access the network enough to justify the cost of the subscription. Additionally, or alternatively, user device 210 may be used to call a customer service representative using the network (e.g., to subscribe user device 210 to the network and/or to allow the user to receive troubleshooting assistance for user device 210). Additionally, or alternatively, user device 210 may be used to place an emergency call, place a collect call, place a toll-free call, visit a particular web page, and/or use a limited amount of network data (e.g., a limited number of voice call minutes and/or a limited amount of data) that the user may pay for on a pay-as-you-go basis.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
    receiving, by a network device, a connection request from a user device that is not subscribed to a network associated with the network device;
    providing, the network device and to the user device a list identifying one or more services to be provided to user devices that are not subscribed to the network,
        the list being based on information, stored in a data structure associated with the network device, from one or more respective content providers that are to offer the one or more services,
        the information, stored in the data structure, identifying one or more packet data network (PDN) parameters for each service of the one or more services;
    receiving, by the network device, a limited service request from the user device based on providing the list to the user device,
        the limited service request identifying a particular service, of the one or more services, to provide to the user device;
    identifying, by the network device, a PDN to be established based on the particular service;
    identifying, by the network device and using the information stored in the data structure, the one or more PDN parameters for the particular service,
        the one or more PDN parameters identifying a data flow that can be provided to the user device,
        the data flow being associated with the particular service;
    establishing, by the network device, the PDN based on the one or more PDN parameters,
        the PDN permitting only the data flow, associated with the particular service, to be transmitted to the user device;
    providing, by the network device, the data flow, associated with the particular service, to the user device via the PDN; and
    providing, by the network device, network usage data, based on providing the data flow associated with the particular service, to a server device to cause the server device to perform a billing settlement function.

2. The method of claim 1, further comprising:
    storing the network usage data.

3. The method of claim 1, where the one or more services allow the user device to place an emergency telephone call, place a non-emergency telephone call, place a collect call, or receive content from a server device.

4. The method of claim 1, where establishing the PDN includes:
  causing a communications tunnel to be established between the network device and the user device based on the one or more PDN parameters,
    the communications tunnel being used to transmit the data flow to the user device.

5. The method of claim 1, further comprising:
  causing the data flow, associated with the particular service, to receive a particular Quality of Service (QoS) treatment based on the one or more PDN parameters.

6. The method of claim 1, further comprising:
  providing an application to the user device for installation on the user device,
    where the list is provided based on the application.

7. The method of claim 6, where receiving the limited service request includes receiving the limited service request based on the application executing on the user device,
  the application causing the user device to provide the limited service request,
  the application being provided to the user device to allow the user device to provide the limited service request and to receive the particular service.

8. A system comprising:
  a network device to:
    receive a connection request from a user device that is not subscribed to a network associated with the network device;
    provide, to the user device, a list identifying one or more services to be provided to user devices that are not subscribed to the network,
      the list, identifying the one or more services, being based on information stored in a data structure associated with the network device,
      the information, stored in the data structure, identifying one or more packet data network (PDN) parameters for each service of the one or more services;
    receive a limited service request from the user device based on providing the list identifying the one or more services to the user device,
      the limited service request identifying a particular service, of the one or more services, to provide to the user device;
    identify a PDN to be established based on the particular service;
    identify, based on the information stored in the data structure, the one or more PDN parameters for the particular service,
      the one or more PDN parameters identifying a data flow that can be provided to the user device,
      the data flow being associated with the particular service;
    establish the PDN based on the one or more PDN parameters,
      the PDN limiting data transmitted to the user device to the data flow associated with the particular service;
    provide the data flow, associated with the particular service, to the user device via the PDN; and
    provide network usage data, based on providing the data flow associated with the articular service, to a server device to cause the server device to perform a billing settlement function.

9. The system of claim 8, where the network device is further to:
  store the network usage data.

10. The system of claim 8, where the one or more services allow the user device to place an emergency telephone call, place a non-emergency telephone call, place a collect call, or receive content from a server device.

11. The system of claim 8, where the network device is further to:
  cause a communications tunnel to be established between the network device and the user device based on the one or more PDN parameters,
    the communications tunnel being used to transmit the data flow to the user device,
  where, when establishing the PDN, the network device is further to establish the PDN based on causing the communications tunnel to be established.

12. The system of claim 8, where the network device is further to:
  cause the data flow, associated with the particular service, to receive a particular Quality of Service (QoS) treatment based on the one or more parameters associated with the PDN.

13. The system of claim 8, where the network device is further to:
  provide an application to the user device for installation on the user device,
  where the list identifying the one or more services is provided, by the user device, via the application.

14. The system of claim 13, where, when receiving the connection request, the network device is further to receive the connection request based on the application executing on the user device,
  the application causing the user device to provide the limited service request,
  the application being provided to the user device to allow the user device to receive the particular service.

15. A computer-readable medium for storing instructions, the instructions comprising:
  a plurality of instructions which, when executed by one or more processors associated with a network device, cause the one or more processors to:
    receive a connection request from a user device;
    provide a list identifying one or more services to the user device,
      the list identifying the one or more services being based on information stored in a data structure associated with the network device,
      the information, stored in the data structure, identifying one or more packet data network (PDN) parameters for each service of the one or more services;
    receive a limited service request from the user device based on providing the list identifying the one or more services to the user device,
      the limited service request identifying a particular service, of the one or more services, to provide to the user device;
    identify a packet data network (PDN) to be established based on the particular service;
    identify the one or more PDN parameters for the particular service,
      the one or more PDN parameters identifying a data flow that can be provided to the user device,
      the data flow being associated with the particular service;
    establish the PDN based on the one or more PDN parameters,
      the PDN permitting the data flow, associated with the particular service, to be transmitted to the user device while preventing another data flow, not associated with the particular service, from being transmitted to the user device; and provide the data flow, associated with the particular service, to the user device via the PDN, network usage data, associated with providing the data flow, being forwarded to a server device to cause the server device to perform a billing settlement function.

16. The computer-readable medium of claim 15, where the plurality of instructions further cause the one or more processors to:

store the network usage data.

17. The computer-readable medium of claim 15, where the plurality of instructions further cause the one or more processors to:

cause the data flow, associated with the particular service, to receive a particular Quality of Service (QoS) treatment based on the one or more PDN parameters.

18. The computer-readable medium of claim 15, where one or more instructions, of the plurality of instructions, to receive the connection request further cause the one or more processors to receive the connection request based on an application executing on the user device that causes the user device to provide the connection request, the application being provided to the user device to allow the user device to provide the connection request and to receive the particular service.

19. The method of claim 1, further comprising:

determining that an identifier of the user device does not match an identifier in a list of identifiers of user devices subscribed to the network; and determining that the user device is not subscribed to the network based on determining that the identifier of the user device does not match an identifier in the list of identifiers of the user devices subscribed to the network.

20. The system of claim 8, where the network device is further to:

determine that an identifier of the user device does not match an identifier in a list of identifiers of user devices subscribed to the network; and determine that the user device is not subscribed to the network based on determining that the identifier of the user device does not match an identifier in the list of identifiers of the user devices subscribed to the network.

\* \* \* \* \*